Feb. 5, 1924.
E. N. HESCOCK
1,482,924
PORTABLE ELEVATOR
Filed March 3, 1923
2 Sheets-Sheet 1
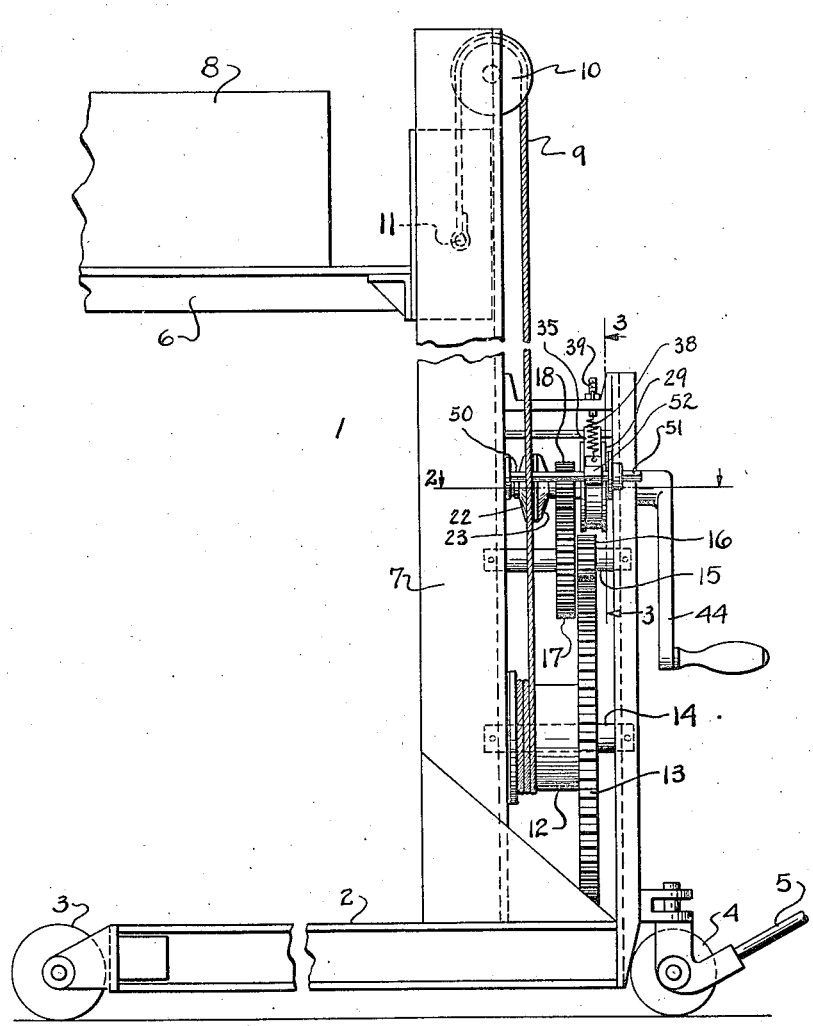

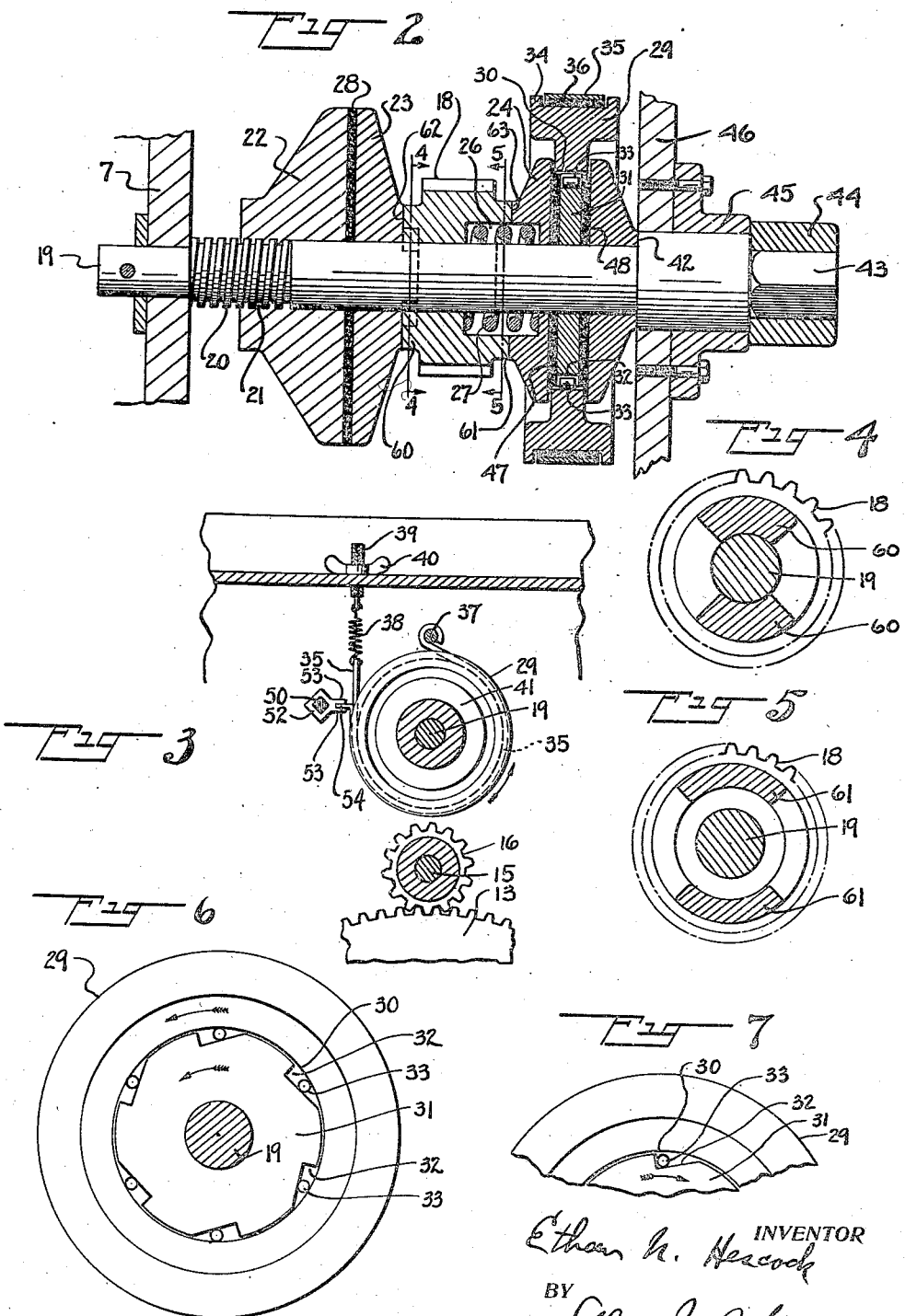

Patented Feb. 5, 1924.

1,482,924

UNITED STATES PATENT OFFICE.

ETHAN N. HESCOCK, OF WESTFIELD, NEW JERSEY, ASSIGNOR TO NEW JERSEY FOUNDRY AND MACHINE COMPANY, A CORPORATION OF NEW JERSEY.

PORTABLE ELEVATOR.

Application filed March 3, 1923. Serial No. 622,584.

*To all whom it may concern:*

Be it known that I, ETHAN N. HESCOCK, a citizen of the United States, residing at Westfield, in the county of Union and State of New Jersey, have made certain new and useful Improvements in Portable Elevators, of which the following is a specification, taken in connection with the accompanying drawings.

This invention is an improvement on my invention illustrated, described and claimed in my copending application Ser. No. 569,737, filed June 20, 1922.

By my invention I can raise the platform with its load at a relatively slow speed, and permit it to descend at slow speed after depositing its load, or to save time and labor expense, permit the platform to descend at a relatively high speed, the platform at all times being under control to avoid a too rapid descent which might injure the apparatus or the workmen.

My invention further relates to a portable elevator in which the load can be raised with the minimum effort or power being exerted on the crank, or equivalent drive member.

My invention further relates to certain combinations of elements and details of construction which will be hereinafter described and pointed out in the claims.

Various forms of apparatus may be employed to carry out my invention. For the purpose of illustrating my invention and its mode of operation, I have shown in the drawings one form which I preferably employ, but to which I am not to be limited.

In the accompanying drawings the same reference numerals refer to similar parts in the several figures.

Of the drawings:

Fig. 1 is a side elevation of a portable elevator equipped with my invention;

Fig. 2 is a horizontal section substantially on the line 2—2 of Fig. 1, looking in the direction of the arrows;

Fig. 3 is a vertical section substantially on the line 3—3 of Fig. 1;

Fig. 4 is a vertical section substantially on the line 4—4 of Fig. 2, looking in the direction of the arrows;

Fig. 5 is a vertical section substantially on the line 5—5 of Fig. 2, looking in the direction of the arrows, the coil spring being omitted;

Fig. 6 is a vertical detail section showing the brake wheel and clutch member;

Fig. 7 is a detail fragmentary view showing the automatic clutch in the opposite position from that shown in Fig. 6.

In the drawings 1 is a portable elevator, having a frame 2, traction wheels 3, 3 (only one appearing in the drawings) a swivel traction wheel 4, a handle 5, a movable platform 6 and a vertical support or guide 7. In the drawings, the platform 6 is shown with a box 8 being raised to stack or tier it. The rope 9 pases over the pulley 10 and is engaged around the pin 11 carried by the platform 6. Any particular arrangement of these elements so far described may be employed, for my invention relates particularly to the hoist mechanism for raising and lowering the platform 6.

The rope or flexible member 9 is wrapped around the winding drum 12. This drum is secured to a drum gear 13, both the drum and gear being loosely mounted upon the axle 14. Adjacent to the periphery of the drum gear 13 is the axle 15 on which is loosely mounted the connected gear wheels 16 and 17, the former in mesh with the teeth of the drum gear and the latter in mesh with the pinion 18. This pinion is loosely mounted upon an axle 19, which is provided with cam surfaces, preferably in the form of screw-threads 20, which cooperate with female screw-threads 21 in the friction disc 22, Fig. 2. The pinion 18 is connected in any suitable manner with the two friction discs 23 and 24. Preferably, this connection is such that a very slight relative lateral movement is permitted between the pinion 18 and its friction discs 23 and 24.

I have shown in the drawings one way of connecting these members, though of course other forms of connections may be used. In the form illustrated, the pinion 18 is provided with two sets of lugs 60, 60 and 61, 61 (see Figs. 4 and 5). The lugs 60, 60 fit into and cooperate with similar grooves or receses 62 in the friction disc 23; the lugs 61, 61 fit into and cooperate with the grooves or recesses 63, 63 in the friction disc 24. This insures that the friction discs 23 and 24 will rotate with the pinion 18, but may have a slight relative lateral movement with relation to it.

Within the friction disc 24 and the pinion

18 I preferably form a chamber 26 within which I mount a coil spring 27. Between the faces of the friction discs 22 and 23, I may mount any suitable form of friction ring 28. Adjacent to the friction disc 24 is mounted a brake wheel 29, having an apertured central portion 30. Between the brake wheel 29 and the axle 19 I mount any suitable form of automatic clutch which will free the brake wheel 29 on elevating the platform 6, but will clutch the brake wheel 29 on any retrograde movement of the shaft 19, and thereby bring the brake into operation.

For purposes of illustration, I have shown a clutch member 31 mounted on the axle and between it and the brake wheel 29. This clutch member is provided with one or more inclined pockets 32, 32 in which rollers 33, 33 are mounted.

The periphery of the brake wheel 29 is provided with a groove 34, within which is mounted a brake band 35, having a friction surface 36. One end of this friction band 35 is held immovably by the pin 37, the other end being connected to a coil spring 38, which in turn is secured to the screw-thread rod 39 adjusted by the wing nut 40.

The friction disc 41 is mounted on the axle 19 and abuts against a shoulder 42 formed on the axle and integral with it. The end 43 of the axle 19 is formed angular in cross-section to cooperate with a removable hand crank 44. The axle 19 is supported in the vertical support or guide 7, and also in the bearing 45 mounted on the frame 46.

Interposed between the friction discs 24 and the clutch member 31 is a friction ring 47; and between the friction disc 41 and the clutch member 31 is a similar friction ring 48.

In my present invention to raise the platform 6, with its load 8, the hand crank 44 is mounted on the end 43 of the axle 19, as shown in Figs. 1 and 2, and is rotated clockwise. This will cause the cam surfaces, or screw-threads 20 and 21, to cooperate with each other and force the friction disc 22 to the right, Fig. 2, moving with it the friction ring 28, friction disc 23, pinion 18, friction disc 24, friction ring 47, clutch member 31, friction ring 48 and friction disc 41 and clamp all these members firmly together against the shoulder 42 on the axle 19. This will then cause all these parts to operate together in unison and rotate as one with the axle 19 so that the continued rotation of the axle 19 will rotate the pinion 18, and through it the gears 17, 16 and 13, to wind the rope 9 upon the winding drum 12 to raise the platform 6.

This will cause the clutch member 31 to rotate clockwise in the direction shown by the arrow in Fig. 7, thereby causing the rollers 33, 33 to move down their inclined pockets 32, 32 and revolve with the clutch member, without, however, rotating the brake wheel 29, which remains stationary as long as the mechanism is operated to raise the platform 6. It will be noted, therefore, that there is no drag or friction of the brake wheel 29 and brake band 35 to be overcome in raising the load. The power to be applied on the crank 44 need be only that necessary to raise the load on the platform, no additional power being necessary, for example, to overcome the friction of the brake wheel 29 and brake band 35, which are, as previously noted, immovable as the platform 6 is being raised.

By my invention I can, after raising the platform 6 with its load, lower it under control either at high or low speed. Of course, after depositing the load the quicker the platform 6 can be brought back to the level of the frame 2, to be again loaded, materially saves time in stacking or tiering a plurality of articles.

To retract or permit the plaform 6 to descend at a relatively low speed I exert pressure upon the hand crank 44 in the opposite direction to that required to raise the load, letting the hand crank rotate with the axle 19, but at the same time exerting a retarding action upon the crank 44 in the nature of back pedalling on a bicycle not equipped with a coaster brake. This will cause the friction disc 22 with its screw-threads 21 to move slightly upon the screw-threads 20 upon the axle 19 sufficient to permit a relative slipping of the pinion 18 with its friction disc 23 and 24 upon the discs 22 and the clutch member 31, so that the pinion 18, together with the other gears 17, 16 and 13, will permit the winding drum 12 to rotate slowly and permit the platform 6 to slowly descend.

This platform 6, however, will be instantly stopped, in any position, by simply letting up on the back pressure on the crank 44. Such action will immediately cause the screw-threads 20 and 21 to operate to move the friction disc 22, with the pinion 18 and its friction discs 23 and 24, to the right of Fig. 2 and grip the clutch member 31 between the friction rings 47 and 48 and the friction discs 24 and 41. This will cause the clutch member 31 to move with the parts just mentioned for a fraction of a revolution counter clockwise, as shown in Fig. 6. Instantly the rollers 33, 33 will move up these inclined pockets 32, 32 and lock the brake wheel 29. Further retrograde, or counter clockwise rotation is prevented by the brake band 35. The platform 6 will therefore be held automatically and instantly at any point where the back pressure, or back pedalling, ceases upon the hand-crank 44.

I also provide means to permit the platform 6 to be lowered under control at a relatively high speed so that it can be brought back quickly with the minimum effort to its loading position.

In the particular form of apparatus which I have illustrated, by way of example, I mount another axle 50, having a squared end 51 for the reception of the hand crank 44, or another hand crank if desired. On this axle 50 I mount a yoke 52, Fig. 3, having two arms 53, 53 between which is mounted a lug 54 carried by the brake ring 35. To lower the platform 6 quickly, I remove the hand crank 44 from the axle 19 and place it upon the end 51 of the axle 50 and rotate it slightly against the action of the coiled spring 38, so as to lessen the friction of the brake band 35 upon the brake wheel 29. By moving the crank slightly the platform 6 may be lowered at any desired speed. At all times, however, the platform can be instantly arrested by simply removing the pressure from the crank 44 permitting the spring 38 to again function, which will cause the braking action of the brake band 35 upon the brake wheel 29 to immediately stop the descent of the platform at any point in its descent.

After the platform has been brought back into its loading position and again loaded the crank 44 is removed from the axle 50 and again placed on the end of the axle 19 when the operation of raising the platform 6 is repeated.

Having thus described this invention in connection with an illustrative embodiment thereof, to the details of which I do not desire to be limited, what is claimed as new and what is desired to secure by Letters Patent is set forth in the appended claims.

What I claim is:—

1. In a hoist mechanism the combination of an axle, a pinion loosely mounted on the axle, friction discs loosely mounted on the axle, a clutch member mounted on the axle, a brake wheel mounted on the clutch member, means to automatically connect the clutch member and brake wheel on one direction of rotation and release said members on the reverse direction of rotation, means to clamp said friction discs and clutch member together on rotation of the axle in one direction and to permit slipping of the parts when the loose members rotate, or tend to rotate, faster than the axle, and friction means bearing on the brake member.

2. In a hoist mechanism the combination of an axle, a pinion loosely mounted on the axle, friction discs loosely mounted on the axle, a clutch member mounted on the axle, a brake wheel mounted on the clutch member, means to automatically connect the clutch member and brake wheel on one direction of rotation and release said members on the reverse direction of rotation, means to clamp said friction discs and clutch member together on rotation of the axle in one direction and to permit slipping of the parts when the loose members rotate, or tend to rotate, faster than the axle, friction means bearing on the brake member, and means to control the friction of the friction member and permit quick rotation of the loose members on the axle.

3. In a portable elevator the combination of a frame, a movable platform to be raised and lowered, an axle, loose friction discs, hoist mechanism including a pinion, a rotating brake wheel loosely mounted upon a clutch member mounted on the axle, automatic clutching members between the clutch member and the brake wheel adapted to operate to lock the platform at any desired elevation, a cam connection between the axle and one of the loose friction discs, a fixed brake member bearing upon the brake wheel, means to rotate the axle to lift the movable platform free from any drag of the brake mechanism, said rotating means adapted to rotate with but retard the rotation of the axle to control the friction of the brake wheel to permit the platform to be lowered slowly.

4. In a portable elevator the combination of a frame, a movable platform to be raised and lowered, an axle, loose friction discs, hoist mechanism including a pinion, a rotating brake wheel loosely mounted upon a clutch member mounted on the axle, automatic clutching members between the clutch member and the brake wheel adapted to operate to lock the platform at any desired elevation, a cam connection between the axle and one of the loose friction discs, a fixed brake member bearing upon the brake wheel, means to rotate the axle to lift the movable platform free from any drag of the brake mechanism, said rotating means adapted to rotate with but retard the rotation of the axle to control the friction of the brake wheel to permit the platform to be lowered slowly and additional means to control the friction of the brake wheel to permit the platform to be lowered at a relatively high speed if desired.

ETHAN N. HESCOCK.

Witnesses:
B. J. HANN,
E. F. SMITH.